(12) United States Patent
Pfister

(10) Patent No.: US 8,815,756 B2
(45) Date of Patent: Aug. 26, 2014

(54) CONTOURED COMPOSITE ARMOUR PANELS AND SYSTEMS COMPRISING SUCH PANELS

(75) Inventor: Karl Gerhard Pfister, Ontario (CA)

(73) Assignee: 2040422 Ontario Inc., Dorchester, Ontario (CA)

( * ) Notice: Subject to any disclaimer, the term of this patent is extended or adjusted under 35 U.S.C. 154(b) by 1223 days.

(21) Appl. No.: 12/303,834

(22) PCT Filed: Jun. 11, 2007

(86) PCT No.: PCT/CA2007/001046
§ 371 (c)(1),
(2), (4) Date: Jun. 7, 2010

(87) PCT Pub. No.: WO2007/140626
PCT Pub. Date: Dec. 13, 2007

(65) Prior Publication Data
US 2010/0288115 A1    Nov. 18, 2010

Related U.S. Application Data

(60) Provisional application No. 60/804,360, filed on Jun. 9, 2006.

(51) Int. Cl.
| | |
|---|---|
| *B32B 27/04* | (2006.01) |
| *B32B 27/12* | (2006.01) |
| *B32B 5/26* | (2006.01) |
| *B32B 3/00* | (2006.01) |
| *B32B 3/02* | (2006.01) |
| *F41H 5/00* | (2006.01) |
| *F41H 5/02* | (2006.01) |
| *F41H 5/04* | (2006.01) |
| *B32B 3/06* | (2006.01) |

(52) U.S. Cl.
CPC ............ *F41H 5/0428* (2013.01); *B32B 3/06* (2013.01)
USPC ............. 442/134; 442/135; 442/262; 428/72; 428/81; 428/156; 428/192; 89/36.02; 89/930; 89/914; 89/915; 89/917; 89/904; 89/906

(58) Field of Classification Search
CPC ....... F41H 5/04; F41H 5/0414; F41H 5/0428; F41H 7/02; F41H 7/00; B32B 3/06
USPC ................ 89/36.02, 904, 906, 915, 917, 930; 2/2.5, 2.11–2.17, 455–467; 442/59, 442/134, 135, 246–255, 262; 428/70, 81, 428/156, 192, 212, 2
See application file for complete search history.

(56) References Cited

U.S. PATENT DOCUMENTS 3,061,839 A * 11/1962 Foster ................................ 2/2.5
3,444,033 A *  5/1969 King ................................ 428/49

(Continued)

FOREIGN PATENT DOCUMENTS

| AT | 338628 T | 9/2006 |
| AU | 2003279606 | 5/2004 |

(Continued)

*Primary Examiner* — Jennifer A Steele

(57) ABSTRACT

An armor panel provides a continuous armored strike face defined within a periphery. The panel is manufactured from a composite material having a plurality of armor tiles embedded in a polymeric matrix that is structurally reinforced by a layer of fiber fabric. The armored strike face may be contoured to accommodate the base upon which it will be mounted. In some applications, an armor system is assembled from at least two of the armor panels. In such a system, at least a portion of the periphery of each armor panel defines an internal seam edge of the armor system. Each such periphery portion is in a lapping relationship with the corresponding internal seam edge of another armor panel.

7 Claims, 2 Drawing Sheets

(56) References Cited

U.S. PATENT DOCUMENTS

| | | | |
|---|---|---|---|
| 3,867,239 A * | 2/1975 | Alesi et al. | 428/48 |
| 4,911,061 A | 3/1990 | Pivitt et al. | |
| 7,363,846 B1 * | 4/2008 | Dean et al. | 89/36.05 |
| 7,866,248 B2 * | 1/2011 | Moore et al. | 89/36.02 |
| 2006/0051564 A1 | 3/2006 | Jacobs et al. | |
| 2007/0164474 A1 | 7/2007 | Srey et al. | |

FOREIGN PATENT DOCUMENTS

| | | |
|---|---|---|
| BR | 0315860 | 9/2005 |
| CA | 1316733 | 4/1993 |
| CN | 1708392 | 12/2005 |
| DE | 4008741 | 9/1990 |
| DE | 60308223 | 10/2006 |
| DK | 1575758 | 1/2007 |
| EP | 1575758 | 9/2005 |
| EP | 1724097 | 11/2006 |
| JP | 2006504925 | 2/2006 |
| KR | 20050067211 | 6/2005 |
| MX | PA05004717 | 8/2005 |
| NL | 1021805 | 5/2004 |
| SE | 9000980 | 9/1990 |
| SE | 506321 | 12/1997 |
| WO | WO2004039565 | 5/2004 |

\* cited by examiner

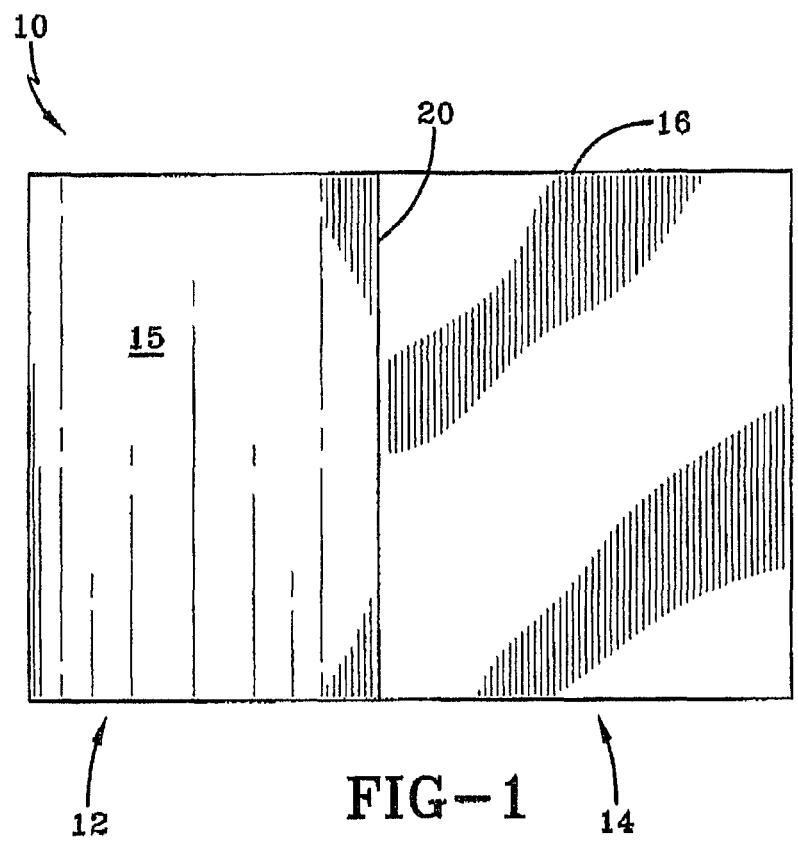
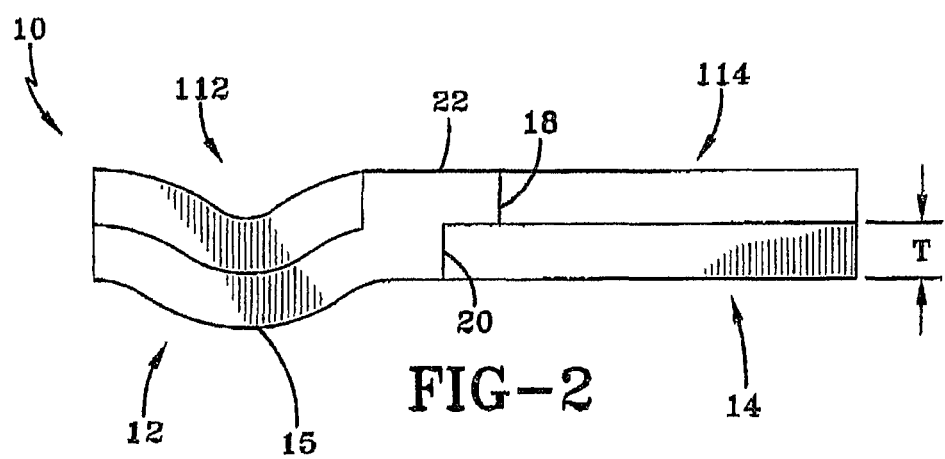

CONTOURED COMPOSITE ARMOUR PANELS AND SYSTEMS COMPRISING SUCH PANELS

CROSS-REFERENCE TO RELATED APPLICATIONS

The present invention claims benefit of priority to U.S. patent application Ser. No. 60/804,360, which was filed on 9 Jun. 2006, and which is incorporated by reference as if fully recited herein.

TECHNICAL FIELD

The present invention relates to armour panels.

BACKGROUND OF THE ART

In vehicle armour, particularly armour intended for military vehicles, points of weakness exist at gaps and edges of panels, as well as at connection joints between adjacent panels. Also, covering contoured surfaces with a plate-like armour panel introduces additional internal seam lines, that is, lines where adjacent armour panels are arranged to constitute the overall panel system.

SUMMARY OF THE INVENTION

The armour panel of the present invention is manufactured from a composite material comprising a plurality of armour tiles embedded in a polymeric matrix that is structurally reinforced by a layer of fibre fabric. These and other objects, advantages and features of the invention are set forth in greater detail in the detailed description of the preferred embodiments, in the drawings, and in the claims.

In some embodiments, the periphery comprises an edge adapted for use in lapping relationship with another surface, particularly an edge of another armour panel of the same type.

BRIEF DESCRIPTION OF THE DRAWINGS

A better understanding of the embodiments will be obtained by reference to the accompanying drawings, wherein identical parts are identified with identical reference numbers, and wherein:

FIG. 1 is a top plan view of an embodiment of an armour system;

FIG. 2 is a side view of the FIG. 1 armour system;

DETAILED DESCRIPTION OF A PREFERRED EMBODIMENT

Figure 3:
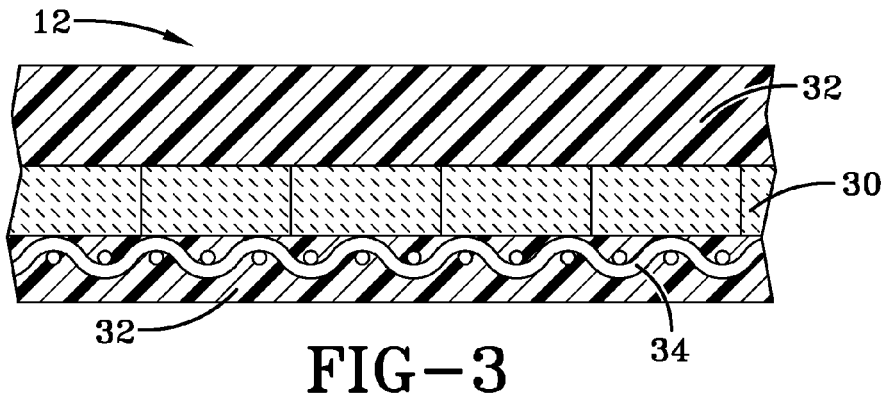
FIG. 3 is an enlarged side sectional view of a portion of an armour panel.

Various preferred embodiments are described. In some embodiments, the periphery comprises an edge adapted for use in lapping relationship with another surface, particularly an edge of another armour panel of the same type.

In some embodiments, the armour panel has a contoured armoured strike face.

Many of the embodiments will use ceramic armour tiles, with a reinforcing fibre fabric that is a woven fabric and which is selected from the group consisting of: aramid polymer, glass, carbon, cellulose and combinations thereof.

In at least some embodiments, the continuous armoured strike face is provided by at least one of: a layer of abutting armour tiles and a plurality of layers of armour tiles in overlapping relationship.

In many embodiments, the peripheral edge of the armour panel that is adapted for lapping relationship will comprise a composite material with two layers of the armour tiles. Such a material will place the tile layers in an overlapping stairstep relationship, with one of tile layers extending further outwardly in the peripheral direction than the other tile layer. This arrangement will form a recess that is sized and shaped to receive a corresponding edge of an adjoining armour panel.

A peripheral edge of this type may be formed by the steps of: a) manufacturing the armour panel in a first mould of appropriate contour; b) manufacturing a flat profile strip in a second mould; and c) bonding the flat profile strip atop the armour panel. In achieving this, the peripheral edge of the armour panel formed in the first mould is provided with a step profile having lower and upper portions, the lower portion comprising fibre fabric and armour panel embedded in the polymer matrix, with the upper portion devoid of the armour tiles and extending outwardly from the lower portion. The flat profile strip, which comprises a plurality of the armour tiles and fibre fabric embedded in the polymeric matrix, is sized to fit upon the upper portion.

From at least two armour panels as described above, an armour system for a vehicle or the like can be provided, wherein at least a portion of the periphery of each armour panel defines an internal seam edge of the armour system, with each such periphery portion in a lapping relationship with the corresponding internal seam edge of another armour panel.

In these armour systems, at least one of the armour panels can have a contoured armoured strike face.

FIG. 1 shows a top plan view of an armour system 10, intended for use on a vehicle or the like. The armour system 10 comprises two armour panels 12, 14, the specifics of which are described in more detail below. Of the two panels, armour panel 12 is a contoured, or three-dimensional, panel (as seen better in FIG. 2) and armour panel 14 is planar, or two-dimensional, although an armour system 10 may consist of any combination of contoured and planar panels. Of particular interest in FIG. 1 is the strike face 15 of the system 10, which is defined as the face of the system contained within the system periphery 16. It will be noted that periphery 16 of the armour system 10 consists of a part of the periphery of panel 12 and a part of the periphery of panel 14. One portion 20 of the periphery of panel 14 is visible in FIG. 1. This portion 20 is not a part of the armour system periphery 16. In the following, this portion 20 (and similar portions) will generally be referred to as an internal seam edge. Not visible in FIG. 1 (but visible in FIG. 2) is an internal seam edge 18 of panel 12. While not shown in FIG. 1, it will be understood that a panel can be a part of an armour system 10, with the panel having its entire periphery being internal seam edge with regard to the armour system. If internal seam edge 20 would be formed by abutting panels 12 and 14, then the internal seam edge would present exactly the type of gap on the strike face that has been an unsolved problem of the prior art.

Although armour system 10 is illustrated as being rectangular in plan view, this is not a feature of all embodiments. Edges that comprise the periphery 16, as well as edges that comprise internal seam edges 18 can be straight, arcuate, or even irregular, depending upon the requirements of the application.

Several further features of the armour system are notable in FIG. 2. First, the contoured nature of panel 12 is seen, as is the planar nature of panel 14. While not necessarily a feature of all embodiments, each of the illustrated panels 12, 14 are shown as having a thickness T that is generally constant, with the exception of a portion 22 of panel 12 near the internal seam edge 18.

A further feature of the armour system 10 is shown at the face opposite the strike face 15. Because the portion 22 increases the depth of the armour system, it would be a common, although not necessary, practice to provide a layer of filler material, especially a foamed filler material such as urethane to provide a continuous surface opposite the strike face. Foamed filled material 112, 114 are illustrated as providing this continuous surface in FIG. 2

Turning now to FIG. 3, an enlarged (and somewhat exaggerated) side section view of a panel, such as either panel 12 or 14. The panel is a composite material comprising a layer of armour tiles 30 embedded in a polymeric matrix 32 that is structurally reinforced by a layer of fibre fabric 34. The thickness of the polymeric matrix relative to that of the tiles or the fibre fabric is enhanced or exaggerated.

In many embodiments, the fibre fabric is a woven material where the fibres are an aramid polymer, that is, a long-chain synthetic polyamide in which 85% or more of the amide linkages are attached directed to two aromatic rings. These aramids are well-known and readily available commercially from, for example, DuPont, of Wilmington, Del., which markets one such product under the trademark KEVLAR. Another aramid is available under the trademark TWARON, from the Twaron BV division of the Teijin Group. Other embodiments could use fibres of glass, carbon, cellulose, or any combination thereof. Primary factors in selecting the fibre would include compatibility with the polymeric matrix, strength in reinforcing the polymer matrix and tiles to maintain structural integrity and durability. Although the weave of the fabric 34 is shown in FIG. 3 as being aligned with the abutting edges of the tiles 30, this is not a required feature and it may be preferred in some instances to align the fabric so that both the warp and weft fibres of the fabric run obliquely with regard to the abutting tile edges.

The preferred tiles 30 for the panel 12 are ceramic, especially alumina oxide, silicon carbide, boron carbide, or any combination thereof. However, it will be known by those of skill in this art to use other tiles to provide the desired effect.

The matrix material is selected from a number of known materials, including epoxy resin, vinyl ester, polyurethane, phenolic resin and thermoplastic compound. The exact selection will tend to be determined most strongly by compatibility with the tile material selected. If necessary, the surface of the tile may be treated to enhance the adhesion of the polymer to the tile.

Figure 4:
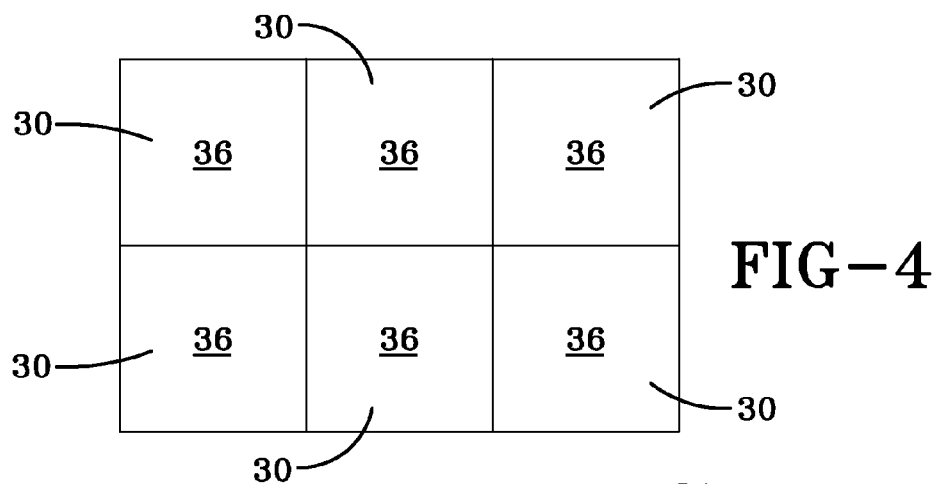
FIG. 4 is an enlarged top plan view of the tile layer in the FIG. 3 embodiment.

Further, and with respect to the tiles, a preferred tile 30 is a rectangular solid, with width and depth aspects, which define the facial area of the tile, that are significantly larger than the thickness aspect of the tile. However, any space-filling shape of facial area may be used, such as triangles, hexagons, etc. In the embodiment illustrated in FIG. 3, the tiles 30 are placed in edge-to edge abutting relationship, so that only a single layer of the tiles project their facial area towards the strike face of the panel, thereby providing the continuous armoured strike face. Viewed from the top, as in FIG. 4, these facial areas 36 are easily seen. In an embodiment that is not illustrated, multiple layers of the tiles 30 may be used in the panel 12, 14, with edges being staggered from layer to layer.

In general, the process for fabricating an armour panel 12, 14 as described above will be accessible to one of ordinary skill once the shape and materials are determined. The fabrication process involves resin transfer molding of a one piece armour panel, eliminating free edges and their welded joints.

A conventional mould is provided, having a shape appropriate for the panel to be formed. At least one layer of the fibre fabric layer 34 is inserted into a cavity of the mould. The layer of armour tiles 30 is placed on the fibre fabric 34. The tiles 30 are aligned to match each face of the mold profile. Each tile 30 directly abuts adjacent tiles, defining a continuous layer of the tiles along the profile of the mold, without gaps between tiles. In many embodiments, a further layer of fibre fabric 34 is draped atop the layer of the tiles 30. When a plurality of fibre fabric layers is used, they may be of varying types or may be of different weaves or densities.

As is conventional in this moulding art, a vacuum system may be used for applying the polymer for the matrix, as may a gravity feeder or a pressure feeder. In some instances, the polymer is applied as a heated melt that solidifies upon cooling. In other instances, the polymer is applied as two component liquids that react with each other to provide the solid polymer. It will be known in many circumstances to prepregnate the fibre fabric with a resin matrix, as well as to provide the tiles with a surface treatment to facilitate adhesion.

The composite matrix of fabric, tiles and polymer is then subjected to a cure time or a solidification period, depending upon the nature of the polymer. Although this step can occur at ambient conditions, heating or cooling may be appropriate, as suggested by the supplier of the polymer.

Once set up, the armour panel of composite material is cut from the mould, using one of a variety of techniques, such as Computer Numeric Control ("CNC").

In certain situations, the preparation of the armour panel becomes more complex than the preparation of a simple fibreglass reinforced polymer panel, such as would be used in an awning or the like. This additional complexity is required by the ballistic performance required of the armour. For example, the fibre fabric may shift during the polymer addition, causing movement of the tile layer, introducing gaps between the tiles.

To alleviate this problem, the tiles are first mounted in place according to the desired contours of the strike face profile. Then, the fibre fabric layers are inserted to fill the cavity between the mold interior and the mounted tiles. The entire contents of the mould are then pressurised. Additional layers of fibre fabric are also added above the tiles, and the resin matrix is ingested using a vacuum feed assembly. This alternative method prevents the misalignment of the ceramic tile structure, as they are rigidly fixed in place until the setting process of the composite material is complete.

Figure 5:
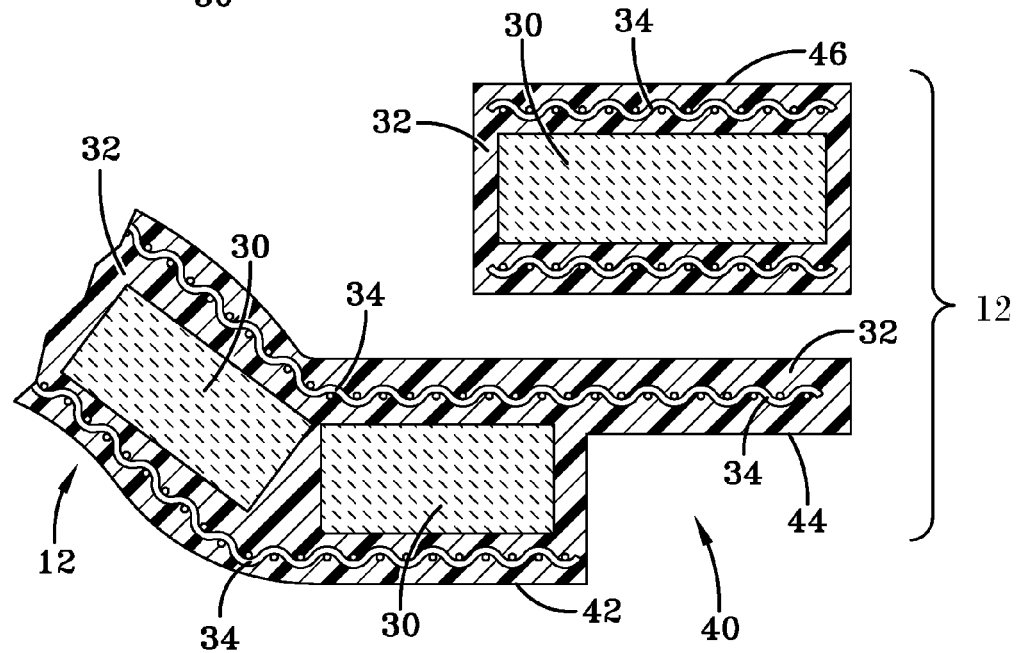
FIG. 5 is an enlarged side sectional view, illustrating a method of forming a lapping joint edge for an armour panel.

A final aspect of the invention is provided by a method for providing the lapping joint design shown in FIG. 2. This method is shown in enlarged side sectional view in FIG. 5. In this view, armour panel 12 is formed in a mould as described above. The mould provides a lip along the edge where a "step" profile is to be formed. The step section 40 has a lower portion 42 and an upper portion 44. The lower portion 42 is shown with an upper and lower fibre layer 34, a tile layer 30 and the embedding polymer matrix 32, which is again illustrated in an exaggerated manner. The upper portion 44 is devoid of the tile layer, having only an extension of the upper fibre layer 34 and the polymer matrix 32. Separately formed in another mould is a rectangular, flat-faced profile 46. This profile 46 has one or two fibre layers 34 (two are shown in FIG. 5) and a centrally located tile 30. Although not shown in this two-dimensional view, it is understood that further tiles 30 may abut the illustrated tile in the direction going into the figure. FIG. 5 shows profile 46 positioned above the upper portion 44, in a manner that puts tile 30 of the profile 46 in a stair step relationship to the tile 30 in the lower portion 42. From this position, profile 46 is matingly lowered onto the edge of panel 12, where it is bonded thorough known techniques selected as appropriate for the matrix polymer, as the facing surfaces being bonded both comprise that polymer. After this bonding is set up, a glue foam material (not shown) may be used to smooth out the transition between the panel 12 and profile 46. The area generally shown as 40 then provides a recess for receiving a panel, such as panel 14 in FIG. 2. Mechanical techniques for joining of panels 12 and 14 in that configuration will be well known. Importantly, tile 30 of profile 46 is effectively centred above the abutment of panels 12, 14.

While the embodiments discussed above are directed at use on vehicles and, in particular, military vehicles, the application of the inventive principles to non-military vehicles, such as armoured bank cars, limousines, and the like, will be readily apparent, as will applications beyond vehicles.

What is claimed is:

1. An armour panel, comprising:
   a continuous armoured strike face defined within a periphery, manufactured from a composite material comprising a plurality of armour tiles embedded in a polymeric matrix that is structurally reinforced by a layer of fibre fabric,
   wherein the periphery comprises an edge for use in lapping relationship with another surface,
   wherein the edge comprises said composite material with two layers of the armour tiles, said tile layers being in overlapping stairstep relationship, with one of said tile layers extending further outwardly in the peripheral direction than the other tile layer, forming a recess sized and shaped to receive a corresponding edge of an adjoining armour panel.

2. The armour panel of claim 1, wherein:
   the armoured strike face is contoured.

3. The armour panel of claim 1, wherein:
   the armour tiles are ceramic.

4. The armour panel of claim 1, wherein:
   the reinforcing fibre fabric is woven and is selected from the group consisting of: aramid polymer, glass, carbon, cellulose and combinations thereof.

5. The armour panel of any of the preceding claims, wherein:
   the continuous armoured strike face is provided by at least one of: a layer of abutting armour tiles and a plurality of layers of armour tiles in overlapping relationship.

6. An armour system for a vehicle or the like, comprising:
   at least two armour panels of claim 1, wherein at least a portion of the periphery of each armour panel defines an internal seam edge of the armour system, with each such periphery portion in a lapping relationship with the corresponding internal seam edge of another armour panel.

7. The amour system of claim 6, wherein
   at least one of the armour panels has a contoured armoured strike face.

* * * * *